United States Patent [19]
Belding et al.

[11] 3,950,504
[45] Apr. 13, 1976

[54] PROCESS FOR PRODUCING MAGNESIUM ALUMINATE SPINEL

[75] Inventors: Jeffrey H. Belding, Ocean County; Erwin A. Letzgus, Somerset County, both of N.J.

[73] Assignee: Quigley Company, Inc., New York, N.Y.

[22] Filed: Sept. 26, 1974

[21] Appl. No.: 509,495

[52] U.S. Cl.................................. 423/600; 106/62
[51] Int. Cl.² ........................................ C01F 7/16
[58] Field of Search....................... 423/600; 106/62

[56] References Cited
UNITED STATES PATENTS

| | | |
|---|---|---|
| 2,805,167 | 9/1957 | McCreight et al................. 423/600 |
| 3,106,447 | 10/1963 | Charvat .............................. 423/600 |
| 3,304,153 | 2/1967 | Bakken et al...................... 423/600 |
| 3,370,963 | 2/1968 | Bonner et al. .................... 423/600 |
| 3,472,615 | 10/1969 | Wang.................................. 423/600 |

*Primary Examiner*—Herbert T. Carter
*Attorney, Agent, or Firm*—Connolly and Hutz

[57] ABSTRACT

Disclosed is the production of high purity magnesium aluminate spinel by blending alumina as ESP fines with a finely divided source of magnesia in a MgO:Al$_2$O$_3$ weight ratio of between about 0.4 to 0.8 and firing the blend at 900°C. or above.

5 Claims, No Drawings

PROCESS FOR PRODUCING MAGNESIUM ALUMINATE SPINEL

BACKGROUND OF THE INVENTION

This invention relates to spinel manufacture. More specifically, it relates to an improved process for the production of high purity magnesium aluminate spinel.

Pure stoichiometric magnesium aluminate spinel has been produced on a small scale by electric fusion processes and has demonstrated its utility as a superior refractory material. The following comparison of the spinel with other common refractories indicates why:

| Refractory | Spinel | Alumina | Mullite | Periclase |
|---|---|---|---|---|
| Chemical Composition | $MgAl_2O_4$ | $Al_2O_3$ | $3Al_2O_3 \cdot 2SiO_2$ | $MgO$ |
| Properties | | | | |
| Melting point, °C. | 2135 | 2015 | 1830 | 2800 |
| Density, g/cc | 3.6 | 4.0 | 3.2 | 3.6 |
| Mean specific heat, cal/gm °C. (20–1000 °C.) | 0.257 | 0.270 | 0.238 | 0.287 |
| Mean reversible thermal expansion cm/cm °C. (20–1000 °C.) | $7.6 \times 10^{-6}$ | $8.8 \times 10^{-6}$ | $5.3 \times 10^{-6}$ | $13.5 \times 10^{-6}$ |
| Thermal conductivity, cal/cm² sec (°C./cm) | | | | |
| 100°C. | 0.036 | 0.072 | 0.014 | 0.090 |
| 1000°C. | 0.014 | 0.015 | 0.009 | 0.017 |

In addition, the spinel exhibits first deformation at 2 kg/cm² at 2000°C.; does not react with silica until 1735°C., with magnesia or calcium oxide until they are taken into solid solution at 2000°C. or with α-alumina until 1925°C.; can be used to hold all metals except alkaline earths; and shows better resistance to alkalis than alumina, better spall resistance than chrome-magnesite refractories and excellent basic slag resistance.

The many attempts to produce a low cost magnesium aluminate spinel grain of high purity have not resulted in commercial success. These attempts typically involved the following steps: physical mixing of high purity sources of alumina and magnesia; calcination at 900° to 1500°C.; grinding; pelletizing and finally sintering at 1600° to 1900°C. The technical complexities of such processes are responsible for the present very limited use of magnesium aluminate spinel as a refractory.

SUMMARY OF THE INVENTION

It has now been found that a high purity magnesium aluminate spinel may be produced by simply blending alumina in the form of electrostatic precipitator (ESP) fines with a finely divided source of magnesia in such proportion as to provide a magnesia:alumina weight ratio of about 0.4 to 0.8 and heating the blend to a temperature of at least about 900°C. for a period of time sufficient for substantially complete reaction of the blend to form spinel. Preferably, the blending includes grinding and the heating is carried out at a temperature above the sublimation point of sodium oxide for a period of time sufficient to produce spinel having a bulk density of at least about 90 percent of theory and a sodium oxide content below about 0.1 weight percent. Thus is offered a process yielding a high quality spinel which both circumvents the use of premium grade raw materials and eliminates expensive processing steps.

DETAILED DESCRIPTION OF THE INVENTION

This process entails the blending of ESP fines as hereinafter defined and a finely divided magnesia source in the desired ratio followed by the firing of the blend at or above about 900°C. until the blend is substantially reacted to form magnesium aluminate spinel.

The source of alumina used in the practice of this invention is ESP fines. By "ESP fines" is meant by-product alumina dust which is recovered during the calcination of alumina-bearing hydrates such as gibbsite in the manufacture of aluminum oxide for reduction to aluminum metal. The term ESP refers to "electrostatic precipitator," a common method for collection of such dust. It will be appreciated that the term ESP fines embraces all such by-product alumina dust, even if collected by other techniques. This dust, considered too fine for efficient recycling in the calcination, contains about 80–97.5 weight percent alumina and constitutes about 75–100 weight percent of particles finer than 20 microns.

The ESP fines from gibbsite calcination represents a relatively nonhomogeneous mixture which may contain alpha-, eta-, delta- and chi-alumina, gibbsite, sodium carbonate and chemically bound sodium oxide. Unpredictable variability of the relative proportions of these components plus the high sodium oxide content would appear to eliminate the untreated ESP fines from consideration for use in ceramic and refractory applications. The fines, however, has been found to be an excellent source of alumina for producing magnesium aluminate spinel, the very high reactivity of the fines causing the spinel to densify at temperatures lower than would normally be expected and the high sodium oxide content of the fines being dramatically reduced during the normal spinel sintering process, as hereinafter explained.

While the ESP fines from the calcination of gibbsite is preferred, those from the calcinations of other alumina-source minerals, such as nordstrandite, bayerite and pseudomorphous trihydrate, may be used in the spinel formation.

Following are analytical data for ESP fines collected during typical calcinations of gibbsite together with the usual range of values encountered with ESP fines:

| | Supplier A | Supplier B* | Range |
|---|---|---|---|
| Composition (wgt %)** | | | |
| L.O.I.*** (1325°C.) | 2.00–14.00 | 12.00 | 2–16 |
| $Al_2O_3$ | Primary | Primary | 80–97.5 |
| $SiO_2$ | 0.01–0.06 | 0.08 | 0.01–0.2 |
| CaO | — | 0.02 | 0.005–0.2 |
| $Fe_2O_3$ | 0.01–0.03 | 0.04 | 0.01–0.1 |

|  | Supplier A | Supplier B* | Range |
|---|---|---|---|
| $Na_2O$ | 0.90–3.00 | 1.40 | 0.5–4.0 |
| Particle Size Distribution (wgt %) | | | |
| +20 microns | 4.0 | 25.0 | 0–25 |
| +10 " | 16.0 | 49.0 | 0–50 |
| + 5 " | 46.0 | 73.0 | 25–75 |
| + 3 " | 73.0 | 83.0 | 50–90 |
| + 2 " | 86.0 | 88.0 | 70–95 |
| + 1 " | 94.0 | 95.0 | 80–100 |
| +0.5 " | 97.0 | 100.0 | 90–100 |
| True Density (g/cc) | 3.68 | 3.33 | 3.0–4.0 |

*Random samples
**Element content expressed as the oxide
***Loss on ignition

The preferred finely divided sources of magnesia are magnesium carbonate and especially magnesium hydroxide, which are both readily transformed into active magnesia by heating. Analytical data for representative samples as well as the usual range of finely divided magnesium hydroxide are:

|  | Supplier A | Supplier B | Range |
|---|---|---|---|
| Composition (wgt %)* | | | |
| MgO | 98.0 | 96.4 | 94–99 |
| $Al_2O_3$ | 0.2 | 0.2 | 0.1–0.5 |
| $SiO_2$ | 0.4 | 0.5 | 0.2–1.0 |
| CaO | 1.2 | 1.5 | 0.5–2.0 |
| $Fe_2O_3$ | 0.2 | 1.4 | 0.1–2.5 |
| Total | 100.0 | 100.0 | |
| Particle Size Distribution (wgt %) | | | |
| +20 microns | 1.5 | 2.0 | 0–10 |
| +10 " | 3.2 | 6.0 | 0–20 |
| + 5 " | 8.5 | 20.0 | 5–30 |
| + 3 " | 30.0 | 44.0 | 20–60 |
| + 2 " | 57.8 | 63.5 | 40–90 |
| + 1 " | 85.0 | 81.5 | 60–100 |
| +0.5 " | 92.5 | 91.5 | 85–100 |
| True Density (g/cc)** | 2.36 | 2.36 | 2.3–2.4 |

*Ignited basis (1325°C.)
**As hydroxide

Alternative magnesia sources include magnesium acetate, magnesium oxalate, magnesium nitrate, magnesium sulfate and magnesium oxide itself. The finely divided magnesia source will substantially all pass through a 50-mesh screen (U.S. Sieve Series; maximum particle size 300 microns).

The ESP fines and finely divided magnesia source are blended in such proportions that the $MgO:Al_2O_3$ weight ratio in the blend is between about 0.4 and 0.8. In this range, spinel refractory aggregates prepared as hereinafter described have high bulk density and low sodium oxide content. The preferred blend is one in which the ratio is 0.395, that representing stoichiometric proportions of the MgO and $Al_2O_3$, since this produces a refractory aggregate with minimum amounts of secondary phases. Blends with ratios substantially below stoichiometric produce aggregates with low bulk density and relatively high sodium oxide contents.

Blending can be accomplished by either a dry or a wet process as long as the mixing results in intimate particle-to-particle contact on a sub-micron scale. Preferably, the blending is accomplished in the presence of water and includes grinding as well as mixing. Suitable units for both dry and wet blending include ball mills, rod mills, Muller mixers and turbine mixers. Additional dry blending units include V-type mixers, while wet blending units include propeller mixers. Blending time will depend on the nature of the alumina and magnesia sources, the type of blending and the unit employed; using the ESP fines and magnesium hydroxide previously described, wet blending in a ball mill requires up to about 4 hours while dry blending requires as long as about 24 hours. If wet blending is employed, the blend is at least partially dried before firing; suitable drying means include, for example, atmospheric drum drying. This drying step can include a prior filtration of the wet blend by such means as rotary drum filtration to remove excess free water from the blend.

As indicated earlier, use of ESP fines to form magnesium aluminate spinel has resulted in unexpectedly low soda ($Na_2O$) contents in the product, the soda content of the spinel blend being reduced from as high as 2 to less than 0.1 weight percent during sintering of the blend as hereinafter described. This soda reduction is highly significant when the product is to be used in refractory or high grade ceramic applications. In fact, alumina producers go to great length to reduce soda contents of high alumina products to this level. Techniques for reducing soda contents of aluminas include the addition of compounds containing boron, fluorine or chlorine which react with the soda at elevated temperatures to form volatile sodium-bearing compounds that leave the alumina during heating. If such addition is not made, the soda level of high fired aluminas would usually be about 0.3 to 0.8 weight percent; this soda is very difficult to remove since it is present in the form of a very stable sodium aluminate.

It is, therefore, reasonable to expect magnesium aluminate spinel prepared from sodium-containing alumina to retain a significant amount of sodium in the high fired product. This is not the case, however, the reduction of the soda content of the spinel to below about 0.1 weight percent being readily accomplished without the use of additives. The proposed mechanism for the soda reduction is the replacement of the sodium in sodium aluminate by magnesium and volatilization of the formed soda at temperatures above its atmospheric sublimation point of about 1275°C. with resultant conversion of the sodium aluminate to magnesium aluminate spinel. Possible reactions include:

$2NaAlO_2 + MgO \rightarrow Na_2O\uparrow + MgAl_2O_4$
$2NaAl_5O_8 + MgO \rightarrow Na_2O\uparrow + MgAl_2O_4 + 4Al_2O_3$
$2NaAl_7O_{11} + MgO \rightarrow Na_2O\uparrow + MgAl_2O_4 + 6Al_2O_3$
$2NaAl_{11}O_{17} + MgO \rightarrow Na_2O\uparrow + MgAl_2O_4 + 10Al_2O_3$ This proposition is supported by the following study in which ESP fines, a blend of ESP fines plus magnesium hydroxide, and a blend of sodium aluminate plus magnesium hydroxide were separately fired for 1 hour at 1680°C.:

| | Composition, Wgt %** | | | | | |
| | Before Firing | | | After Firing | | |
| Charge* | MgO | $Al_2O_3$ | $Na_2O$ | MgO | $Al_2O_3$ | $Na_2O$ |
|---|---|---|---|---|---|---|
| A | 0.0 | 97.3 | 2.6 | 0.0 | 98.9 | 1.0 |
| B | 28.4 | 69.6 | 1.9 | 29.0 | 71.0 | 0.02 |
| C | 19.8 | 50.0 | 30.2 | 29.2 | 68.5 | 2.3 |

*A — ESP fines alone
B — ESP fines plus MgO
C — Sodium aluminate plus MgO
**Ignited oxide basis The blend is fired to produce spinel for use as either refractory aggregate or calcine. In producing refractory aggregate, the blend is granulated, pelletized or briquetted with or without water and/or organic binders to form suitable kiln feed and is then sintered, by techniques conventionally used to sinter dead-burned refractory magnesia aggregate, at temperatures of between about 1600° and 2100°C. Sintering time will depend upon the sintering temperature, but will normally be between about 0.5 and 20 hours. The sintered mass can then be crushed to aggregate for use in refractory products. A typical spinel aggregate prepared from the sintering at 1680°C. for 1 hour of a stoichiometric blend of ESP fines and magnesium hydroxide previously described would be expected to be composed of about 99.3 weight percent magnesium aluminate ($MgAl_2O_4$), 0.47 percent CaO, 0.16 percent $SiO_2$, 0.05 percent $Fe_2O_3$ and 0.03 percent $Na_2O$; and to have a true density of 3.58 g/cc, a bulk density of 3.30 to 3.44 g/cc, a total porosity of 5–8 volume percent and an average crystallite size of less than 10 microns. This is indeed a magnesium aluminate spinel of high purity, high bulk density, low porosity and of crystallite size conducive to excellent structural integrity.

Calcined magnesium aluminate spinel, which can be used to make ceramic articles or as an additive in refractory products, is prepared by firing the blend at temperatures of between about 900° and 1600°C. normally for from about 0.5 to 4 hours using standard calcination techniques. The reacted spinel can be used as is or can be ground to powder. The calcine is not as pure as the corresponding refractory aggregate since its lower firing temperature results in a lower reduction of the soda content; all other impurities are present in about the same amounts as in the higher fired aggregate. Typically, a stoichiometric spinel calcine may contain about 0.04 to 1.7 weight percent $Na_2O$. The higher soda levels will be reduced to about 0.1 weight percent or less when the calcine is subjected to elevated temperature during further processing or in refractory application. Such low-cost calcine produced by this process can offer excellent reactivity for producing dense pure spinel ware, but the higher temperature calcines can also offer inertness for refractory applications.

If desired, a fluxing agent can be added during blending to promote more rapid densification at lower sintering temperatures. Preferred fluxing agents are inorganic fluoride compounds, especially cryolite ($Na_3AlF_6$) and aluminum fluoride ($AlF_3$). The amount of fluxing agent can vary considerably, the preferred level for cryolite being about 0.6 to 2.5, and that for aluminum fluoride about 0.5 to 2.0, weight percent of the blend.

The following examples are merely illustrative and are not to be construed as limiting the invention, the scope of which is defined by the appended claims. In these examples, unless indicated otherwise, all temperatures are in degrees centigrade (°C.), all compositions are in weight percent or weight ratios and all densities are in grams per cubic centimeter (g/cc).

EXAMPLE 1

Samples of the electrostatic precipitator fines (ESP fines) from the dust collector of the rotary calciner for producing reduction grade alumina and of powdered magnesium hydroxide were air dried at 105°C. The dried materials analyzed as follows:

| Composition (wgt %) | ESP Fines | Magnesium Hydroxide |
|---|---|---|
| Loss on ignition (1325°C.) | 6.21 | 31.8 |
| $Al_2O_3$ | 92.34 | 0.1 |
| MgO | — | 66.9 |
| $SiO_2$ | 0.05 | 0.3 |
| CaO | — | 0.8 |
| $Fe_2O_3$ | 0.02 | 0.1 |
| $Na_2O$ | 1.38 | — |
| Total | 100.0 | 100.0 |
| Particle Size Distribution (wgt %) | | |
| +20 microns | 4.0 | 1.5 |
| +10 " | 16.0 | 3.2 |
| +5 " | 46.0 | 8.5 |
| +3 " | 73.0 | 30.0 |
| +2 " | 86.0 | 57.8 |
| +1 " | 94.0 | 85.0 |
| +0.5 " | 97.0 | 92.5 |
| True Density (g/cc) | 3.68 | 2.36 |

The dried materials plus water were charged to a 0.3-gallon ball mill in the following amounts:

| | |
|---|---|
| ESP Fines | 145.1 g |
| Magnesium Hydroxide | 84.9 g |
| Water | 250.0 g |

The charge ($MgO:Al_2O_3 = 0.423$) was milled for 4 hours. The resulting slurry was filtered on a laboratory filter funnel to yield a cake containing 30 percent water. The cake after air drying at 105°C. had a bulk density of about 1.35 g/cc. The dried cake was sintered at 1680°C. by firing it at that temperature for 1 hour; the resultant mass was cooled and crushed to aggregate for use in refractory products.

The aggregate had a true density of 3.57 g/cc compared to the theoretical density of 3.58 g/cc for stoichiometric magnesium aluminate spinel, a bulk density of 3.33 g/cc (93 percent of theory) and an average crystallite size of less than 10 microns. X-ray diffraction analysis revealed that spinel formation was complete. Chemical composition of the aggregate was as follows:

| | |
|---|---|
| $MgAl_2O_4$* | 97.4 wgt % |
| MgO* | 1.9 |
| CaO* | 0.47 |
| $SiO_2$ | 0.16 |
| $Fe_2O_3$ | 0.05 |
| $Na_2O$ | 0.03 |

*The indicated amounts of these components are based on the assumption that the calcium content of the aggregate is present entirely as CaO.

EXAMPLE 2

A refractory aggregate was prepared following the procedure of Example 1 except that the charge was milled for only 0.5 hour to perform blending with minimal grinding. The properties of the aggregate were equivalent to those of the aggregate of Example 1 with the exception that the bulk density was 3.10 g/cc (87 percent of theory).

EXAMPLE 3

The procedure of Example 1 was used to prepare a series of refractory aggregates in which the amounts of ESP fines and magnesium hydroxide charged to the ball mill were varied to give $MgO:Al_2O_3$ ratios of from 0.200 to 0.800 with the following results:

| Charge MgO:Al$_2$O$_3$ | Refractory Aggregate | | | Phase Other Than Spinel Present |
|---|---|---|---|---|
| | Fired Bulk Density | | Wgt % Na$_2$O | |
| | g/cc | % Theory | | |
| 0.800 | 3.27 | 91 | 0.06 | MgO |
| 0.429 | 3.39 | 95 | 0.02 | MgO |
| 0.395* | 3.39 | 95 | 0.03 | MgO** |
| 0.386 | 2.25 | 63 | 0.06 | None |
| 0.376 | 1.76 | 49 | 0.17 | None |
| 0.200 | 1.59 | 44 | 1.01 | Al$_2$O$_3$ |

*Stoichiometric ratio
**Very slight amount MgO

EXAMPLE 4

The ingredients of Example 1 plus aluminum fluoride crystals were charged to a 0.3-gallon ball mill in the following amounts:

| | |
|---|---|
| ESP Fines | 141.2 g |
| Magnesium Hydroxide | 85.3 g |
| Aluminum Fluoride (AlF$_3$) | 3.5 g |
| Water | 250.0 g |

The charge (MgO:Al$_2$O$_3$= 0.437) was milled for 4 hours and then air dried at 105°C. The dried cake was fired at 1680°C. for 1 hour, cooled and crushed. The resulting aggregate, which X-ray diffraction indicated was completely reacted spinel with a slight excess of MgO, had a bulk density of 3.39 g/cc (95 percent of theory) and the following chemical composition:

| | |
|---|---|
| MgAl$_2$O$_4$* | 96.7 wgt % |
| MgO* | 2.6 |
| CaO* | 0.47 |
| SiO$_2$ | 0.16 |
| Fe$_2$O$_3$ | 0.05 |
| Na$_2$O | 0.03 |

*The indicated amounts of these components are based on the assumption that the calcium content of the aggregate is present entirely as CaO.

EXAMPLE 5

The procedure of Example 1 was repeated except that the dried filter cake was calcined at 1425°C. for 4 hours rather than sintered at 1680°C. for 1 hour. The calcined cake, which was readily crushable, was analyzed as completely reacted spinel with a slight excess of MgO, the calcine having a true density of 3.56 g/cc and a Na$_2$O content of 0.58 percent.

EXAMPLE 6

The ingredients of Example 1 plus cryolite were charged to a 0.3-gallon ball mill in the following amounts:

| | |
|---|---|
| ESP Fines | 142.4 g |
| Magnesium Hydroxide | 83.3 g |
| Cryolite (Na$_3$AlF$_6$) | 4.3 g |
| Water | 250.0 g |

The charge (MgO:Al$_2$O$_3$ = 0.423) was milled, filtered and dried following the procedure of Example 1. The dried cake was calcined at 900°C. for four hours and the resulting calcine was dry ball milled for eight hours. X-ray diffraction analysis of the milled calcine revealed that spinel formation was complete and a slight excess of MgO was present; the Na$_2$O level of the calcine was 1.70 weight percent.

The milled calcine was treated with 5 weight percent water and pressed at 10,000 psi (703 kg/cm$^2$) into 1 × 1 × 2 inches (2.5 × 2.5 × 5.1 cm) slugs. The slugs were fired at 1680°C. for 1 hour. Bulk density of the fired slugs was 3.37 g/cc (94 percent of theory) while the Na$_2$O level was 0.6 weight percent.

EXAMPLE 7

An aggregate was prepared following the procedure of Example 1 except that the firing was for 4 hours and at a temperature of 1600°C. instead of 1680°C. The bulk density of the aggregate was 3.09 g/cc (86 percent of theory) and the Na$_2$O content was 0.04 weight percent.

EXAMPLE 8

A sample was prepared following the procedure of Example 7 except that the fired cake was treated as a 1600°C. calcine: it was crushed and then ball milled for 8 hours. The resulting powder had a soda content of 0.04 weight percent and was spinel with a slight excess of MgO as determined by X-ray diffraction. The calcine was then treated with 5 weight percent water, pressed into 1 × 1 × 2 inches (2.5 × 2.5 × 5.1 cm) slugs at 10,000 psi (703 kg/cm$^2$) and fired at 1680°C. for 1 hour. Bulk density of the fired slugs was 3.42 g/cc (96 percent of theory) and the Na$_2$O content was 0.02 weight percent.

EXAMPLE 9

Dried ESP fines as described in Example 1 and calcined nesquehonite as described below were charged with water into a 0.3-gallon ball mill:

| Calcined Nesquehonite Component | wgt % | Charge | |
|---|---|---|---|
| MgO | 98.35 | ESP Fines | 111.11 g |
| Al$_2$O$_3$ | 0.5 | Calcined Nesquehonite | 80.89 g |
| | | Water | 318.00 g |
| SiO$_2$ | <0.1 | | |
| CaO | <0.1 | | |
| Fe$_2$O$_3$ | <0.1 | | |

The charge (MgO:Al$_2$O$_3$ = 0.781) was processed into refractory aggregate following the procedure of Example 1 with the following results:

| | | |
|---|---|---|
| Wet Cake | | |
| Water content (wgt %) | 39 | |
| Dried Cake Before Firing | | |
| Bulk density (g/cc) | 1.14 | |
| Refractory Aggregate | | |
| Composition (wgt %) | | |
| MgAl$_2$O$_4$ | 78.6 | |
| MgO | 21.2 | |
| CaO | <0.1 | |
| SiO$_2$ | <0.1 | |
| Fe$_2$O$_3$ | <0.1 | |
| Na$_2$O | <0.1 | |
| Bulk density (g/cc) | 3.05 | (85% of theory) |

EXAMPLE 10

The ingredients of Example 1 were charged to a 300-gallon ball mill in the following amounts:

| | |
|---|---|
| ESP Fines | 247.48 lb |
| Magnesium Hydroxide | 150.48 lb |
| Water | 425.10 lb |

The charge (MgO:Al$_2$O$_3$ = 0.44) was milled for 10 hours and the resulting slurry was air dried in pans at 105°C. The dried material was delumped and then pelletized, adding water as a binder, in a high-speed mixer-pelletizer. Size distribution of the resulting spherical pellets was:

| | |
|---|---|
| On 5 mesh* | 40 wgt % |
| −5 on 7 mesh | 30 |
| −7 on 16 mesh | 28 |
| −16 mesh | 2 |

The bulk density of the dried pellets was 1.56 g/cc.

The pellets were fired at 1680°C. for 1 hour to yield a product with the following properties:

| Size Distribution (wgt %) | | |
|---|---|---|
| On 5 mesh* | 11 | |
| −5 on 7 mesh | 24 | |
| −7 on 16 mesh | 59 | |
| −16 mesh | 5 | |
| Composition (wgt %) | | |
| MgAl$_2$O$_4$** | 95.32 | |
| MgO** | 3.15 | |
| CaO** | 0.66 | |
| SiO$_2$ | 0.74 | |
| Fe$_2$O$_3$ | 0.08 | |
| Na$_2$O | 0.05 | |
| Bulk Density (g/cc) | 3.26 | (91% of theory) |

*U.S. Sieve Series (ASTM E-11-61). See Lange's Handbook of Chemistry, 11th Edition, Section 11, page 2 (1973).
**The indicated amounts of these components are based on the assumption that the calcium content of the aggregate is present entirely as CaO.

EXAMPLE 11

Magnesium aluminate spinel is prepared following the procedure of Example 1 except that the charge contains no water and is milled for 24 hours, compacted at 10,000 psi (703 kg/cm$^2$) into slugs and fired for 1 hour at 2100°C.; refractory aggregate of comparable quality is obtained from the crushed slugs.

What is claimed is:

1. A process for the production of high purity magnesium aluminate spinel refractory which comprises blending alumina in the form of ESP fines with a finely divided source of magnesia in such proportion as to provide a magnesia:alumina weight ratio of about 0.4 to 0.8 and heating said blend to a temperature of from about 1600° to 2100°C for a period of time sufficient for substantially complete reaction of said blend to produce spinel having a bulk density of at least about 90 percent of theory and a sodium oxide content below about 0.1 weight percent.

2. The process of claim 1 wherein said magnesia source is magnesium hydroxide.

3. The process of claim 1 wherein said blending is carried out in the presence of water.

4. The process of claim 1 wherein said alumina and said magnesia source are blended in approximately stoichiometric proportions.

5. The process of claim 1 wherein said blending includes grinding.

* * * * *